[11] 3,580,337

| [72] | Inventors | William B. Gogarty;<br>Richard W. McAtee, Littleton, Colo. |
|---|---|---|
| [21] | Appl. No. | 816,047 |
| [22] | Filed | Apr. 14, 1969 |
| [45] | Patented | May 25, 1971 |
| [73] | Assignee | Marathon Oil Company<br>Findlay, Ohio |

[54] METHOD FOR STABILIZING THE MOBILITY OF POLYACRYLAMIDE SOLUTIONS FLOWING THROUGH POROUS MEDIA
27 Claims, No Drawings

[52] U.S. Cl. .................................................. 166/273, 166/274
[51] Int. Cl. ........................................................ E21b 43/22
[50] Field of Search ........................................... 166/305, 273, 274, 275, 311, 295

[56] References Cited
UNITED STATES PATENTS

| 3,020,953 | 2/1962 | Zerweck et al. | 166/275X |
| 3,039,529 | 6/1962 | McKennon | 166/275 |
| 3,305,019 | 2/1967 | Katzer | 166/311X |
| 3,308,885 | 3/1967 | Sandiford | 166/295 |
| 3,367,418 | 2/1968 | Routson | 166/274 |
| 3,370,649 | 2/1968 | Wogelmuth | 166/274 |
| 3,400,761 | 9/1968 | Latimer Jr. et al. | 166/274 |
| 3,478,823 | 11/1969 | Murphy | 166/274 |

*Primary Examiner*—Stephen J. Novosad
*Attorneys*—Joseph C. Herring, Richard C. Willson, Jr. and Jack L. Hummel ABSTRACT: Oil saturations are decreased by flooding the oil-bearing subterranean formation with an aqueous solution of relatively low salt content containing a high molecular weight partially hydrolyzed polyacrylamide having incorporated therein from about 1 to about 50 ppm of a divalent cation of a water-soluble salt. The divalent cation stabilizes the polyacrylamide in the aqueous solution with regard to mechanical degradation and such enables a bank of the aqueous solution to maintain its mobility while traveling through the formation.

METHOD FOR STABILIZING THE MOBILITY OF POLYACRYLAMIDE SOLUTIONS FLOWING THROUGH POROUS MEDIA

BACKGROUND OF THE INVENTION

This invention relates to secondary and tertiary recovery of oil wherein a bank of an aqueous polyacrylamide solution is utilized. More particularly, this invention relates to a method of stabilizing aqueous polyacrylamide solutions while flowing through porous media, e.g. hydrocarbon-bearing subterranean formations.

In an effort to increase the recovery of oil in a waterflooding operation, various viscosity enhancing agents have been incorporated in the water flood. One particularly useful agent is a high molecular weight partially hydrolyzed polyacrylamide. Relatively small amounts of these polymers when added to an aqueous medium of low salt content have have the ability to substantially increase the viscosity of the solution. A flooding medium having a mobility very near that of the formation oil and water will substantially improve secondary recovery of the oil.

Is is recognized that viscosity alone is not the only factor which must be taken into account in understanding displacements of the formation oil by a displacing medium. In particular, recovery of oil has been found to be directly dependent upon the ratio of mobilities of the displacing media and the media to be displaced. Mobility ratio as defined herein is represented by the equation:

$$R_M = \frac{M_d}{M_0} = \frac{K_d}{\mu_d} \frac{\mu_0}{K_0}$$

where $M_d$ is the mobility of the displacing media and $M_o$ is the mobility of the oil in the formation, and where $K_d$ and $K_o$ are the effective permeabilities, respectively, of the oil-bearing formation to the displacing fluid and the connate oil, and where $\mu_d$ and $\mu_o$ are the apparent viscosities, respectively, of the displacing fluid and the connate oil. Highest recoveries and, hence, lowest residual oil saturation are obtained when $R_M$ is equal to or somewhat less than unity.

In the past, this mobility ratio has often been unfavorable principally because the value of $M_k$ has been considerably greater than the value of $M_o$, thus obtaining a mobility ratio of much greater than unity. This unfavorable mobility ratio is exemplified by the common water flood where the mobility of the displacing water media is much greater than the mobility of the flowing oil. The effect of using thickening agents (also identified as mobility reducing agents) in a water flood is to reduce the value of $M_d$, thus, improving the mobility ratio. However, as has been recognized, aqueous polymer solutions, such as the aqueous partially hydrolyzed polyacrylamide solutions, present the problem of degradation upon flow through porous media. See, for instance, "Control with Polymer Solution," Society of Petroleum Engineers' Journal, W. B. Gogarty, June, 1967, pp. 161—173. As the polymer degrades while flowing through a porous media such as found in an oil-bearing subterranean formation, the mobility of the displacing medium ($M_d$) increases, due primarily to its decrease in viscosity ($\mu_d$), $M_d$ and mobility ratio ($R_M$) of displacing medium to flowing oil becomes unfavorable. With this condition, the polymer solutions' potentially high viscosity at lower shear rates is not exploited. In this sense, the polymer solution is being used inefficiently.

Heretofore, the degradation of the aqueous polymer solution while flowing through porous media has necessitated further addition of substantial amounts of polymer to maintain the desired mobility. Many of these polymers, especially the polyacrylamide polymers, are expensive and continued addition of these polymers greatly increases the cost of a flooding operation. This is especially the case when the crude oil to be displaced is highly viscous.

The problem of an inability to maintain this desirable mobility ratio is resolved by utilizing the methods of the present invention.

SUMMARY OF THE INVENTION

We have found that the aqueous polymer solutions of relatively low salt content flowing through porous media may be stabilized, with regard to mobility, and hence a more favorable mobility ratio may be obtained, for higher percentage recovery of oil, by incorporating into the solutions from about 1 to about 50 p.p.m. of a divalent cation of a water soluble salt. The solution can be used directly as a water-type flood, or can be preceded by suitable displacing agent(s) for recovering oil.

DETAILED DESCRIPTION OF THE INVENTION

The aqueous solution into which the polyacrylamide and sufficient stabilizing divalent cation are added is preferably of relatively low salt content," that is an ion concentration of preferably less than about 4,000 p.p.m. and more preferably less than about 1,000 p.p.m. Deionized water may be used, although economics preferably dictate the use of aqueous solutions having certain monovalent and divalent cation concentrations, e.g. water containing 400 p.p.m. ions, of which 40 p.p.m. are divalent cations. It should be understood, however, that the divalent cation concentration of the aqueous solution is preferably less than 50 p.p.m. as will be apparent from the description hereafter. If the aqueous medium to be used contains too high an ion concentration, these ions should be removed, as by a desalting procedure, or dilution with relatively salt-free water. Determination of proper concentrations of ions (considering both monovalent and divalent concentrations), polymer, and amount of water necessary will be dictated by the given reservoir condition and specifically according to the desired mobility of aqueous polymer solution required.

The salts which impart stability to the aqueous polyacrylamide solution must be water soluble and their cations divalent. Examples of preferred slats for this invention include: calcium salts, exemplified by calcium acetate, calcium benzoate, calcium bichromate, calcium bisulfite, calcium bromide, calcium bromiodide, calcium butyrate, calcium chlorate, calcium chloride, calcium chlorophosphate, calcium ferrocyanide, calcium formate, calcium fumarate, calcium iodide, calcium maleate, calcium propionate, calcium selenite, and calcium thiocyanate and the like; magnesium salts, exemplified by magnesium acetate, magnesium ammonium arsenate, magnesium ammonium chloride, magnesium ammonium phosphate, magnesium benzoate, magnesium bichromate, magnesium bisulfate, magnesium bromate, magnesium butyrate, magnesium chromate, magnesium chlorate, magnesium chloride, magnesium citrate, magnesium phosphite, magnesium maleate, magnesium molybdate magnesium nitrate, magnesium perborate, magnesium permanganate, magnesium phosphite magnesium salicylate, magnesium sulfate, magnesium sulfite, magnesium thiocyanate, and the like; beryllium salts, exemplified by beryllium bromide, beryllium chloride, beryllium nitrate, and beryllium sulfate, and the like; strontium salts exemplified by strontium acetate, strontium arsenite, strontium bromate, strontium bromide, strontium chloride, strontium citrate, strontium formate, strontium nitrate, strontium sulfide, and the like; barium salts exemplified by barium acetate, barium benzoate, barium cyanide, and barium chloride, although barium salts are not preferred because they are generally poisonous; manganese salts exemplified by manganous acetate, manganous ammonium phosphate, manganous benzoate, manganous borate, manganous bromide, manganous chloride, manganous formate, manganous lactate, manganous succinate, and the like; divalent iron salts exemplified by ferrous bromide, ferrous chloride, ferrous nitrate, ferrous sulfate, and the like; cobalt salts exemplified by by cobaltous ammonium sulfate, cobaltous acetate, cobaltous bromate, cobaltous chlorate, cobaltous chloride, cobaltous formate, cobaltous nitrate, cobaltous propionate, and the like; nickel salts exemplified by nickelous acetate, nickelous bromide, nickelous chloride, nickelous nitrate, nickelous sulfate, and the like; copper salts exemplified by cupric acetate, cupric bromide, cupric chlorate, cupric dichromate, cupric formate, cupric nitrate, and the like. This list of cations anions is illustrative and not exhaustive. Salts of zinc, however, are not applicable since they form a precipitate in polyacrylamide solution. The most preferred salts are calcium and magnesium salts, or mixtures thereof, and especially preferred are the water soluble halides of calcium and magnesium. Hydrated species of the salts are also useful.

Examples of useful polyacrylamide polymers are disclosed in U.S. Pat. Nos. 3,396,790 and 3,370,649. In general, the polymers are characterized by relatively high molecular weight, that is, in the range of preferably from less than about $0.5 \times 10$ to about $10 \times 10$ or more, and more preferably from about $1 \times 10$ to about $7 \times 10^6$. Furthermore, they are partially hydrolyzed, that is, from about 5 to about 70 percent of the amide groups of the polymer are hydrolyzed to carboxylic acid or carboxylate groups. An especially preferred commercial partially hydrolyzed polyacrylamide is marketed by The Dow Chemical Company under the trade name Pusher. In the aqueous partially hydrolyzed polyacrylamide solution, it is preferable to use from about 100 to about 2,500 p.p.m. and more preferably from about 250 to about 1,500 p.p.m. of polyacrylamide (by weight) in the solution. One special advantage of this invention is that large concentrations of polymer are not needed to effect the desired mobility control of the polyacrylamide solution.

The aqueous polyacrylamide solution can be further characterized in that preferably molecular oxygen is not present in concentrations greater than preferably 1 p.p.m., and more preferably no greater than 0.05 p.p.m. by weight of the aqueous systems. Oxygen scavenging agent(s), e.g. sodium dithionite, can be incorporated into the aqueous solution. Other compatible additives such as bactericides, corrosion inhibitors, etc. may also be employed in the aqueous polyacrylamide solution.

The amount of divalent cation incorporated into the aqueous polyacrylamide solution is important. Incorporation of large amounts of salts into such a solution will decrease the viscosity of that solution. For instance, the incorporation of brackish water, brine, tap water, and hard water are known to lower the viscosity of a polyacrylamide solution. We have found that only salts having divalent cations are effective in stabilizing the mobility of polyacrylamide solutions having a relatively low salt content flowing through porous media. Salts having monovalent cations and polyvalent cations other than divalent cations have no appreciable stabilizing effect. The concentration of the divalent cation in the final aqueous solution is preferably from about 1 to about 50 p.p.m. and more preferably from about 10 to about 40 p.p.m. and most preferably from about 15 to about 30 p.p.m. by weight of the divalent cation in the aqueous polyacrylamide solution. Use of less than 1 p.p.m. of divalent cation has no appreciable stabilizing effect, and amounts greater than about 50 p.p.m. have the dual disadvantages of facilitating breakdown of the polymer and lowering the viscosity thereof.

While the aqueous polyacrylamide, divalent cation containing solution may be injected directly into an injection well for displacement of subterranean hydrocarbons to at least one producing well, it can preferably follow the injection of the displacing agent which is very capable of displacing formation hydrocarbons, e.g. a miscible or miscible-type displacing agent. Preferably, the mobility of the displacing agent will be about equal to or less than that of the formation fluids, i.e. formation hydrocarbons and formation water. The aqueous polyacrylamide solution is preferably made up to have a frontal mobility about equal to or less than that of the displacing agent. Thus, given a displacing agent with a particular mobility, the aqueous polyacrylamide solution having a desired mobility is obtained by incorporating therein deionized water and from about 1 to about 50 p.p.m. of the divalent cation or a mixture of divalent cations and thereafter adding the polyacrylamide until the desired viscosity is obtained. Further addition of polymer is wasteful. If deionized water is unavailable or its use uneconomical, relatively low salt content water may be used, remembering that divalent cations may be present in the water and only the balance of the divalent ions need be added to obtain the desired concentration.

Any of a number of displacing agents may be employed in this invention, e.g. miscible and miscible-type displacing agents. Preferably, the displacing agent is a micellar dispersion comprised of aqueous medium (soft, brackish or brine water), hydrocarbon, surfactant, and optionally cosurfactant and/or electrolyte. Examples of useful micellar dispersions include those taught in U.S. Pats. Nos. 3,149,669, 3,163,214, 3,208,517, and 3,254,714.

A preferred method of recovering hydrocarbons from subterranean hydrocarbon-bearing formation having at least one injection means and at least one production means involves injecting from 1 to 20 percent formation pore volume of the displacing agent followed with from about 20 to about 80 percent formation pore volume of the divalent cation-containing aqueous high molecular weight, partially hydrolyzed polyacrylamide solution. Even more preferably, the aqueous polyacrylamide solution is followed by water injection, i.e. water drive, to displace the displacing agent and aqueous polyacrylamide solution through the formation to recover hydrocarbon through at least one production well.

The following examples are merely illustrative embodiments of this invention and are not meant to limit it in any way. "Mobility factor" as used in these examples is a measure of the mobility of the fluid. Such is determined by measuring the rate of flow of the solution through a standard permeable, porous media. A resistance to flow provided by the media is analogous in the resistive effect of consolidated sands found in a subterranean core sample. Solutions whose mobility factors do not change appreciably after flowing through a core have relatively stable mobilities. On the other hand, solutions characterized as having mobility reducing factors, indicate polymer degradation and mobility increase while flowing through a core sample.

EXAMPLE 1

This example demonstrates the degradation of an aqueous polyacrylamide solution flowing through a consolidated sand core. The medium in which the polymer is dissolved is deionized water.

A consolidated sand core sample is 7.30 centimeters long, 36.4 cubic centimeters in volume, a permeability of 205 millidarcies, and a pore volume of 8.54 cubic centimeters. An aqueous polyacrylamide solution is made up of 400 p.p.m. of No. 530 Pusher polymer (a trademark of Dow Chemical Company identifying a partially hydrolyzed polyacrylamide having an average molecular weight of about $2 \times 10^6$ in deionized water obtained by treating water with an ion exchange resin. Analysis of the water indicates calcium ion concentration less than 1 p.p.m. and magnesium ion concentration less than 1 p.p.m. The initial mobility factor of the solution is 15.2 and the viscosity as measured by a Brookfield viscometer at 6 r.p.m. is 43.0 c.p. at 72° F. The core is then flooded and a pressure tap inserted half inch from the input end of the core and a sample of flooding media is obtained which is analyzed to have mobility factor of 11.0. After 2.22 pore volumes have been flooded, the output mobility factor is measured to be 9.6 or 63 percent of the initial or input mobility factor. The output viscosity as measured on the Brookfield viscometer at 6 r.p.m. is 28.2 c.p. at 72° F. or 65 percent of the input viscosity.

EXAMPLE 2

This example demonstrates the further degradation, especially the lowering of viscosity, of an aqueous polymer solution traveling through a core approximately twice the length of the core of Example 1.

The consolidated sand core is 13.4 centimeters long, a volume of 66.9 cubic centimeters, a permeability of 102 millidarcies, and a pore volume of 15.94 cubic centimeters. The initial or input mobility factor is 28.9, and the input viscosity is 61.3 c.p. at 72° F. as measured on a Brookfield viscometer at 6 r.p.m. The aqueous polymer solution is the same as in Example 1 except that 400 p.p.m. of No. 700polymer (same as No. 530 Pusher except average molecular weight is about $6\times10^6$ are used in place of the polymer in Example 1. After approximately 1.3 pore volumes are flooded, the output flooding solution has a resistance factor of 17.7, 63 percent of the input mobility factor, and an output viscosity of 29.0 c.p. at 72° F. or 47.4 percent of the input viscosity.

EXAMPLE 3

This example demonstrates that salts having monovalent cations will not stabilize an aqueous polyacrylamide solution flowing through a porous media. Other cations besides sodium, such as potassium similarly have no stabilizing effect.

A consolidated sand core sample is 6.3 centimeters long, a volume of 31.8 cubic centimeters, a permeability 104 millidarcies, and a pore volume of 6.35 cubic centimeters. The flooding media is composed of 450 p.p.m. of No. 700 Pusher in deionized water with 100 p.p.m. of sodium chloride added. The input resistance factor is 6.2 and the input viscosity is 39.5 c.p. at 72° F. as measured on a Brookfield viscometer. After 2.16 pore volumes have been flooded with this aqueous polymer solution, the mobility factor is 3.05, 49.2 percent of the input mobility factor value. After 4.6 pore volumes have been flooded, the viscosity has reduced to a value of 23.0 c.p. at 72° F. or 58.3 percent of the input viscosity.

Additional runs were made with various concentrations of sodium chloride, with no stabilizing ability indicated. Large concentrations have some stabilizing effect, but a serious reduction in initial viscosity of the flooding results.

EXAMPLE 4

A consolidated sand core 5.43 centimeters long, 27.0 cubic centimeters in volume, a permeability of 208 millidarcies, and a pore volume of 5.97 cubic centimeters is flooded with a polyacrylamide solution containing 45 p.p.m. of calcium chloride dihydrate (12.3 p.p.m. Ca++) and 400 p.p.m. of No. 700 polymer in deionized water. The input mobility factor of this solution is 3.95 and the viscosity as measured on the Brookfield viscometer at 6 r.p.m. is 28.0 c.p. at 72° F. After flooding the core with 4.2 pore volume solution, the mobility factor is 3.91 (99 percent of original mobility factor) and the output viscosity 31.0 c.p. at 72° F. (110 percent of input viscosity). It is postulated that the increased in viscosity is attributed to adsorption of calcium ions on the sand particles in the core.

EXAMPLE 5

The procedure used in Example 4 is repeated except the polyacrylamide solution contains 800 p.p.m. of the polymer and 100 p.p.m. of the calcium chloride dihydrate (27.4 p.p.m. Ca++). The core sample has very similar characteristics. The input mobility factor is 5.76 and the output mobility factor is 5.73 (99.6 percent of original mobility factor) after approximately 5 pore volumes of the solution have been flooded through the core. The input viscosity is 46.8 c.p. at 72° F. and the output viscosity is 60.2 c.p. at 72°F. A similar run using 200 p.p.m. calcium chloride dihydrate necessitates the use of a comparatively much large amount of the polymer to attain a viscosity of 40 c.p. This sharp increase in polymer requirements is undesirable because of expense.

EXAMPLE 6

Other runs are made using the same or similar procedure as in the above examples, utilizing magnesium ions, barium ions, and manganese ions. The results are very similar, showing that the polymer may be stabilized by addition of divalent cations.

It is intended that this invention not be limited by the above examples. Rather, all equivalents obvious to those skilled in the art are intended to be equated with the scope of the invention and taught within the specification and appended claims.

We claim:

1. A method of maintaining substantially the mobility of an aqueous solution of relatively low salt content containing high molecular weight, partially hydrolyzed polyacrylamide when flowing through a porous media, the method comprising incorporating into the solution sufficient amounts of water soluble salt of a divalent cation to impart stable mobility to the solution.

2. The method of claim 1 wherein the molecular weight of the partially polyacrylamide is at least about $0.5\times10^6$.

3. The method of claim 1 wherein there is also incorporated in the solution an oxygen scavenging agent.

4. The method of claim 1 wherein there is incorporated in the solution a bactericide.

5. The method of claim 1 wherein from about 1 to about 50 p.p.m. of the cation of the water soluble salt is incorporated into the aqueous solution.

6. A method of claim 1 wherein the cation of the water soluble salt is selected from Group IIA of the Periodic Table.

7. The method of claim 6 wherein the cation of the salt(s) is calcium or magnesium, or mixtures thereof.

8. The method of claim 1 wherein the water soluble divalent salt is calcium chloride or calcium chloride dihydrate.

9. A method of maintaining substantially the mobility of an aqueous solution of deionized water containing high molecular weight, partially hydrolyzed polyacrylamide when flowing through a porous media, the method comprising incorporating into the solution sufficient amounts of water soluble salt of a divalent cation to impart stable mobility to the solution.

10. A method for recovering hydrocarbons from a subterranean hydrocarbon-bearing formation having at least one injection means and at least one production means in fluid communication with the reservoir, comprising injecting through the injection means an aqueous solution of relatively low salt content containing high molecular weight, partially hydrolyzed polyacrylamide having incorporated therein from about 1 to about 50 p.p.m. of the cation of a water soluble salt containing a divalent cation, displacing the aqueous solution through the formation, and recovering hydrocarbon through the production means.

11. The method of claim 10 wherein the molecular weight of the partially hydrolyzed polyacrylamide is at least about $0.5\times10^6$.

12. The method of claim 10 wherein oxygen scavenging agent is incorporated into the aqueous solution.

13. The method of claim 10 wherein a bactericide is incorporated into the aqueous solution.

14. The method of claim 10 wherein the cation is selected from Group IIA of the Periodical Table.

15. The method of claim 14 wherein the cation is calcium or magnesium, or mixtures thereof.

16 The method of claim 10 wherein the water soluble salt is calcium chloride or calcium chloride dihydrate.

17. A method for recovering hydrocarbons from a subterranean hydrocarbon-bearing formation having at least one injection means and at least one production means in fluid communication with the formation, the method comprising in combination:

a. injecting from about 1 to about 20 formation pore volume of a displacing agent;

b. injecting from about 20 to about 80 formation pore volume of an aqueous solution relatively low salt content containing high molecular weight, partially hydrolyzed polyacrylamide and from about 1 to about 50 p.p.m. of the cation of a water soluble salt containing a divalent cation; and thereafter, c. displacing the displacing agent and aqueous solution through the reservoir and recovering and recovering hydrocarbon through the production means.

18. The method of claim 17 wherein the displacing agent is a micellar dispersion.

19. The method of claim 18 wherein the micellar dispersion is comprised of aqueous medium, hydrocarbon, and surfactant.

20. The method of claim 19 wherein the micellar dispersion contains cosurfactant.

21. The method of claim 17 wherein the molecular weight of the partially hydrolyzed polyacrylamide is at least about $0.5 \times 10^6$.

22. The method of claim 17 wherein oxygen scavenging agent is incorporated into the aqueous solution.

23. The method of claim 17 wherein bactericide is incorporated into the aqueous solution.

24. The method of claim 17 wherein the water soluble salt(s) is selected from Group IIA of the Periodic Table.

25. The method of claim 24 wherein the cation(s) of the salt(s) is calcium or magnesium, or mixtures thereof.

26. The method of claim 17 wherein the water soluble salt is calcium chloride or calcium chloride dihydrate.

27. A method for recovering hydrocarbon from a subterranean hydrocarbon-bearing formation having at least one injection means in fluid communication with at least one production means, the method comprising in sequence:

a. injecting into the formation from about 1 to about 20 percent formation pore volume of a micellar dispersion comprising aqueous medium, hydrocarbon, surfactant, and cosurfactant;

b. injecting from about 20 to about 80 formation pore volume of an aqueous solution of relatively low salt content containing partially hydrolyzed polyacrylamide having an average molecular weight of at least about $0.5 \times 10^6$ and from about 1 to about 50 p.p.m. of the cation of a water soluble salt containing divalent cation, and thereafter, c. injecting sufficient drive water to displace the micellar dispersion and aqueous solution through the formation and recovering hydrocarbon through the at least one production means.

UNITED STATES PATENT OFFICE
CERTIFICATE OF CORRECTION

Patent No. 3,580,337      Dated May 25, 1971

Inventor(s) William B. Gogarty and Richard W. McAtee

It is certified that error appears in the above-identified patent and that said Letters Patent are hereby corrected as shown below:

| | |
|---|---|
| Col. 1, line 18: | Delete "have" after "content". |
| Col. 1, line 42: | Delete "$M_k$" and insert --$M_d$--. |
| Col. 1, line 54: | Insert --Mobility-- before "Control". |
| Col. 1, line 60: | After "$(\mu_d)$" delete "$M_d$". |
| Col. 2, line 69: | Delete "by" after "exemplified". |
| Col. 3, line 13: | Delete "0.5x10" and insert --$0.5\times10^6$-- delete "10x10" and insert --$10\times10^6$--. |
| Col. 3, line 14: | Delete "1x10" and insert --$1\times10^6$--. |
| Col. 4, line 66: | Delete "65%" and insert --65.6%--. |
| Col. 5, line 42: | Insert --Pusher-- before "polymer". |
| Col. 6, line 63: | Insert --%-- after "20". |
| Col. 6, line 65: | Insert --%-- after "80". |
| Col. 6, line 73: | Delete "and recovering" after "reservoir". |
| Col. 8, line 8: | Insert --%-- after "80". |

Signed and sealed this 26th day of October 1971.

(SEAL)
Attest:

EDWARD M. FLETCHER, JR.
Attesting Officer

ROBERT GOTTSCHALK
Acting Commissioner of Patents